(12) United States Patent
Agapitos et al.

(10) Patent No.: US 12,015,530 B2
(45) Date of Patent: Jun. 18, 2024

(54) MANAGEMENT ENTITY, NETWORK ELEMENT, SYSTEM, AND METHODS FOR SUPPORTING ANOMALY DETECTION FOR COMMUNICATION NETWORKS

(71) Applicant: HUAWEI TECHNOLOGIES CO., LTD., Shenzhen (CN)

(72) Inventors: Alexandros Agapitos, Dublin (IE); Aleksandar Milenovic, Dublin (IE); Mingqi Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/464,042

(22) Filed: Sep. 8, 2023

(65) Prior Publication Data

US 2023/0421460 A1  Dec. 28, 2023

Related U.S. Application Data

(63) Continuation of application No. PCT/EP2021/081770, filed on Nov. 16, 2021.

(51) Int. Cl.
*H04L 41/16* (2022.01)
*H04L 43/04* (2022.01)
*H04L 43/067* (2022.01)

(52) U.S. Cl.
CPC .............. *H04L 41/16* (2013.01); *H04L 43/04* (2013.01); *H04L 43/067* (2013.01)

(58) Field of Classification Search
None
See application file for complete search history.

(56) References Cited

U.S. PATENT DOCUMENTS

| | | | |
|---|---|---|---|
| 2019/0392351 A1* | 12/2019 | Zuluaga | G06N 20/20 |
| 2020/0084087 A1* | 3/2020 | Sharma | H04W 24/08 |
| 2020/0136890 A1* | 4/2020 | To | H04L 43/0852 |
| 2022/0038332 A1* | 2/2022 | Umakanth | H04L 41/5009 |
| 2022/0382833 A1* | 12/2022 | Riddle | G06F 17/18 |

* cited by examiner

*Primary Examiner* — Quang N Nguyen
(74) *Attorney, Agent, or Firm* — Leydig, Voit & Mayer, Ltd.

(57) ABSTRACT

A management entity for supporting anomaly detection in a communication network is configured to receive, from each of one or more network elements (NEs) of a set of NEs, at least one point determined to be an anomalous point. The one or more points belong to key performance indicator (KPI) time-series data associated with the communication network. The management entity is further configured to provide, to each respective NE of the one or more NEs, a label for a respective point of the one or more points, receive, from each respective NE of the one or more NEs, at least one parameter of an updated local anomaly detection model of the respective NE; and update a global anomaly detection model based on the one or more parameters.

16 Claims, 14 Drawing Sheets

FIG. 6

MANAGEMENT ENTITY, NETWORK ELEMENT, SYSTEM, AND METHODS FOR SUPPORTING ANOMALY DETECTION FOR COMMUNICATION NETWORKS

CROSS-REFERENCE TO RELATED APPLICATIONS

This application is a continuation of International Application No. PCT/EP2021/081770, filed on Nov. 16, 2021, the disclosure of which is hereby incorporated by reference in its entirety.

FIELD

Embodiments of the present disclosure relate to the field of communication networks. Exemplary embodiments of the present disclosure relate to a management entity and a corresponding method for supporting anomaly detection in a communication network. Embodiments of the present disclosure also relate to a network element (NE) and a corresponding method for supporting the anomaly detection in the communication network. Embodiments of the present disclosure also relate to a system for supporting anomaly detection in the communication network.

BACKGROUND

Conventional devices and methods for anomaly detection in communication networks are based on unsupervised or supervised machine learning models.

For example, a conventional method for anomaly detection in a communication network is based on a prediction or a reconstruction model that may predict future instances of Key Performance Indicator (KPI) time-series data. The method may model a distribution of prediction errors in a training sample, and further detect anomalies in the communication network. Another conventional method for anomaly detection in a communication network is based on a proximity model. The proximity model may determine a notion of a distance between a selected point and all of its neighbouring points. Further, a threshold distance may be used to signify an anomalous point.

Another conventional method for anomaly detection in a communication network is based on a statistical model for detecting anomalies in the communication network. The statistical model may be based on a multi-variate statistic such as a Gaussian distribution, Z-scores, median absolute deviations, etc. Moreover, a classifier model, such as a binary classification model, may also be used to map input time-series directly into normal and anomaly classes.

However, an issue of the conventional devices and the methods for detecting anomalies in the communication networks is that the used models are usually parametric models. Hence, the conventional methods may require several parameters to be fine-tuned for achieving an efficient detection.

Further, another issue of the conventional devices and methods may be that the training of the conventional anomaly detection models is performed centralized in the respective management entity. Therefore, data of the communication network may need to be transferred from each network entity to the management entity.

Yet another issue of the conventional devices and methods may be that in cases where classifier models are used, such classifier models should be trained using supervised learning, for example, based on labelled examples of anomalous (e.g., positive examples) and normal data (e.g., negative examples). Furthermore, the training of classifier models may rely on large amounts of data to reach a desired level of detection rate. The labelled data acquisition is expensive in terms of domain expertise needed for manual labelling. Furthermore, anomalies may occur in a fraction of NEs, so that the desired amount of labelled data may not be available to train the classifier model.

SUMMARY

Embodiments of the present disclosure provide improved devices and methods for supporting anomaly detection in a communication network.

Embodiments of the present disclosure support a federated user-feedback driven anomaly detection for network performance indicators.

Embodiments of the present disclosure enable closely monitoring a performance of NEs in the communication network, and to promptly detect anomalies in KPIs of the NEs in the communication network.

A first aspect of the present disclosure provides a management entity for supporting anomaly detection in a communication network. The management entity is configured to receive, from each of one or more network elements (NEs) of a set of NEs, at least one point determined to be an anomalous point, wherein the one or more received points belong to Key Performance Indicator (KPI) time-series data associated with the communication network, provide, to each of the one or more NEs, a label for each point of the one or more received points, receive, from each of the one or more NEs, at least one parameter of an updated local anomaly detection model of that NE, and update a global anomaly detection model based on the one or more received parameters.

Further, the management entity of the first aspect may sent, to one or more NEs of the set of NEs, information concerning the updated global anomaly detection model. For instance, the management entity may send or broadcast, to one or more or all NEs of the set of NEs, at least one of a configuration parameter derived from the updated global anomaly detection model and a parameter of the updated global anomaly detection model.

The management entity may be, or may be implemented in, an electronic device such as a computer, a personal computer, or the like. For example, the management entity may be a computer device for controlling or managing the communication network.

The communication network may be based on a fifth generation (5G) telecommunication network, in which it may be desired to assure a certain Service Level Agreement (SLA). The time-series KPI data comprises, for instance, a plurality of points, wherein each point from the plurality of points is associated with a value for a KPI of a respective NE. For example, the KPI time-series data produced by the NEs may be used, and based thereon data-driven anomaly detection may be formulated as a Machine Learning (ML) problem. Further, the ML problem may be solved using either unsupervised or supervised techniques.

For example, the management entity of the first aspect may comprise a global anomaly detection model. The global anomaly detection model and its associated parameters e.g., a weight matrix may be maintained in the management entity. Furthermore, each NE in the communication network may comprise a local anomaly detection model. The NEs may report anomalies to the management entity.

The management entity may receive the points from the NEs, and may provide a label for each of the points. The points may be associated with a value of a KPI of a respective NE, and the management entity may determine a label for each value.

Optionally, the management entity may determine the label based on, for example, a ML model such as the global ML model, a supervised model that may receive a feedback from a user or a supervisor, a statistical model that may determine the probabilities that the point can be associated with a particular label, or determining a large deviation with respect to a mean value above or under a threshold value for that particular KPI.

The label may be a False Positive (FP) label indicating that the respective NE wrongly determined the respective point to be an anomalous point, or may be a False Negative (FN) label indicating that the respective NE wrongly determined the respective point to not be an anomalous point, or may be a True Positive (TP) label indicating that the respective NE correctly determined the respective point to be an anomalous point, or may be a True Negative (TN) label indicating that the respective NE correctly determined the respective point to not be an anomalous point.

The management entity may further provide the determined label for the point to the respective NE. The management entity may further update the global anomaly detection model. For example, the management entity may receive the at least one parameter, and may periodically update the global anomaly detection model in a federated process using a recent received parameter, e.g., a recent local anomaly detection model parameter received from the NEs.

The management entity of the first aspect may enable a deployment of an automated ML based on the KPI time-series data. For example, by using the management entity of the first aspect, it may be possible to perform a decentralize training of the NEs. Further, when multiple NEs perform a decentralize training, it may be easier to perform an incremental update of the local anomaly detection models, e.g., compared to a case when it is centralized.

The management entity may comprise a circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

In an implementation form of the first aspect, a label provided to a respective NE for a respective point comprises one of:
  a False Positive (FP) indicating that the respective NE wrongly determined the respective point to be an anomalous point,
  a False Negative (FN) indicating that the respective NE wrongly determined the respective point to not be an anomalous point,
  a True Positive (TP) indicating that the respective NE correctly determined the respective point to be an anomalous point,
  a True Negative (TN) indicating that the respective NE correctly determined the respective point to not be an anomalous point.

In a further implementation form of the first aspect, the management entity is further configured to visualize each point of the one or more received points, receive user feedback regarding each point, and determine the label for each point based on the user feedback.

Optionally, the management entity may support federated anomaly reporting and/or a user feedback mechanism. For example, a user may provide a feedback to the output of the local anomaly detection model, which may be the at least one point. The user may designate one or more labels such as FP, FN, TP, and TN to the at least one point. Then, the feedback may be federated, and may further be used to update the local anomaly detection model parameters. The local anomaly detection model parameters may be sent to the management entity for updating the global anomaly detection model.

In a further implementation form of the first aspect, the management entity is further configured to update the global anomaly detection model based on a federated aggregation of the one or more received parameters.

For example, the global anomaly detection model of the management entity may be periodically updated in a federated way using the most recent local anomaly detection model parameter. The NE may asynchronously send the updated parameters of its corresponding local anomaly detection model, e.g., a weight matrix to the management entity. The management entity may aggregate the parameters of the local anomaly detection models, and may obtain a global update parameter for the global model.

In a further implementation form of the first aspect, the management entity is further configured to update the global anomaly detection model by integrating the federated aggregation of the one or more received parameters into a weight matrix of a neural network of the global anomaly detection model.

In a further implementation form of the first aspect, the management entity is further configured to provide one or more configuration parameters derived from the updated global anomaly detection model to each NE of the set of NEs.

For example, the management entity may broadcast the one or more configuration parameters derived from the updated global anomaly detection model to the set of the NEs that are managed by the management entity.

In a further implementation form of the first aspect, the management entity is further configured to broadcast to the set of NEs, at least one of:
  the one or more configuration parameters derived from the updated global anomaly detection model;
  one or more parameters of the global anomaly detection model;
  one or more parameters of the updated global anomaly detection model.

For example, the management entity may broadcast the one or more parameters of the updated global anomaly detection model and/or the one or more configuration parameters derived from the updated global anomaly detection model to the set of the NEs that are managed by the management entity.

For example, during a federated learning lifecycle, the management entity may broadcast the parameters of the global model back to the set of NEs. Broadcasting of the parameters of the global model back to the set of NEs, may ensure that each NE from the set of NEs may be able to be updated according to the latest global anomaly detection model.

For example, in some implementation forms, the management entity may provide the labels to each NE from the set of NEs. Moreover, there may one or more NEs that may not receive the labels. Hence, by broadcasting the parameters of the global anomaly detection model, it may be possible to ensure that all NEs are enabled to be updated with the latest global anomaly detection model, even if they did not receive the labels.

A second aspect of the disclosure provides a Network Element (NE) for supporting anomaly detection for a communication network. The NE is configured to determine, based on a local anomaly detection model, at least one point to be an anomalous point in KPI time-series data associated with the communication network, provide the at least one anomalous point to a management entity, receive a label for each point of a set of points of the KPI time series data from the management entity, wherein the set of points includes the at least one anomalous point provided to the management entity, and update the local anomaly detection model based on the received one or more labels.

The NE of the second aspect may enable a decentralised collaborative training of an anomaly classifier for certain one or more KPIs. For example, a global anomaly detection model and its associated parameters may be maintained in the management entity. Further, the NE may maintain a local anomaly detection model with associated parameters. Moreover, the communication network may comprise a plurality of NEs, wherein each NE may maintain a local anomaly detection model with associated parameters. The local anomaly detection model may be trained with a supervised learning based on user feedback on the output of the anomaly detection model, i.e., FP, FN, TP, and TN. The parameters of the local anomaly detection model may be asynchronously sent from the NE to the management entity.

In the management entity, a periodic update of the global anomaly detection model parameters may be performed based on the most recent or updated parameters of the local anomaly detection model. Finally, the parameters of the global anomaly detection model may be periodically transmitted from the management entity to the NE. Hence, the NE may support the decentralised collaborative training of anomaly classifier.

In an implementation form of the second aspect, the NE is further configured to obtain one or more updated parameters of the local anomaly detection model when updating the local anomaly detection model, and provide the one or more updated parameter to the management entity.

In a further implementation form of the second aspect, the NE is further configured to receive one or more configuration parameters from the management entity, and update the local anomaly detection model based on the one or more configuration parameters.

In a further implementation form of the second aspect, each respective label received from the management entity for a respective point of the set of points comprises one of:
  an FP indicating that the NE wrongly determined the respective point to be an anomalous point,
  an FN indicating that the NE wrongly determined the respective point to not be an anomalous point,
  a TP indicating that the NE correctly determined the respective point to be an anomalous point,
  a TN indicating that the NE correctly determined the respective point to not be an anomalous point.

In a further implementation form of the second aspect, the NE is further configured to generate, based on the received labels for the points of the set of points, a synthetically labelled training sample set, and update the local anomaly detection model by training it with the synthetic labelled training sample set.

The synthetically labelled training sample set may be invoked on the NE based on (e.g., limited) user feedback, for example, based on only one or two labels. For example, a training sample of synthetically labelled data may be generated by using the provided labels. This may decrease the data transmission overhead in the communication network.

Furthermore, by using a synthetic data augmentation and the user feedback, it may be possible to automatically generate examples from both positive and negative classes. This may further reduce the labelled data requirement.

In some implementation forms, the NE may comprise an unsupervised model and a supervised model. The unsupervised model may extract features based on a local KPI predictor. The supervised model may be based on user feedback.

In a further implementation form of the second aspect, the NE is further configured to determine the at least one anomalous point by determining a prediction error for each potentially anomalous point detected in the KPI time series data by using the local anomaly detection module, determining a threshold error based on a distribution of prediction errors that already occurred in the NE, and determining a respective potentially anomalous point to be an anomalous point, when the prediction error for the respective potentially anomalous point is larger than the threshold error.

In a further implementation form of the second aspect, the NE is further configured to classify each determined anomalous point.

A third aspect of the disclosure provides a system for supporting anomaly detection for a communication network, the system comprising a management entity and a set of NEs, wherein each NE from the set of NEs is configured according to the second aspect or one of its implementation forms.

For example, the global anomaly detection model and its associated parameters, such as a weight matrix, may be maintained in the management entity. Further, local anomaly detection models may be provided locally to the corresponding NEs, for example, using an edge deployment procedure. During inference, one or more anomalies may be reported and may be visualized to the user. The user may provide feedback in the form of labels for individual points of the KPI time-series. The labels may be FP, FN, TP, TN. The feedback may be used for generating a synthetic labelled training sample via a data augmentation procedure. The set of NEs may update the local anomaly detection models based on the synthetic labelled training sample.

The management entity of the first aspect and/or the NE of the second aspect and/or the system of the third aspect may achieve one or more of following benefits:
  Enhancement of privacy and network security with respect to the NE data. For example, since very limited information is exchanged between the NEs and management entity, this may be reduced to few parameters such as the parameters of the local anomaly detection model in a form of the Neural Network weight matrix.
  Enabling a local anomaly detection model training and inference at respective NE. This may further enable a utilization of less bandwidth for the training of the local anomaly detection model and anomaly detection inference, i.e., detecting anomalies using the anomaly detection model in real time.
  Lowering a latency in real-time anomaly detection inference.
  Reducing number of labelled samples needed for training the anomaly detection model, for example, reducing to one or two labels such as FP/FN/TP/TN.

Reducing false anomaly rates and improving anomaly detection rates with collaborative training of supervised anomaly detection models on a federated labelled training sample.

A fourth aspect of the disclosure provides a method for a management entity for supporting anomaly detection in a communication network, the method comprising receiving, from each of one or more NEs of a set of NEs, at least one point determined to be an anomalous point by the NE, wherein the one or more received points belong to KPI time-series data associated with the communication network, providing, to each of the one or more NEs, a label for each point of the one or more received points, receiving, from each of the one or more NEs, at least one parameter of an updated local anomaly detection model of that NE, and updating a global anomaly detection model based on the one or more received parameters.

In an implementation form of the fourth aspect, a label provided to a respective NE for a respective point comprises one of:
an FP indicating that the respective NE wrongly determined the respective point to be an anomalous point,
an FN indicating that the respective NE wrongly determined the respective point to not be an anomalous point,
a TP indicating that the respective NE correctly determined the respective point to be an anomalous point,
a TN indicating that the respective NE correctly determined the respective point to not be an anomalous point.

In a further implementation form of the fourth aspect, the method further comprises visualizing each point of the one or more received points, receiving user feedback regarding each point, and determining the label for each point based on the user feedback.

In a further implementation form of the fourth aspect, the method further comprises updating the global anomaly detection model based on a federated aggregation of the one or more received parameters.

In a further implementation form of the fourth aspect, the method further comprises updating the global anomaly detection model by integrating the federated aggregation of the one or more received parameters into a weight matrix of a neural network of the global anomaly detection model.

In a further implementation form of the fourth aspect, the method further comprises providing one or more configuration parameters derived from the updated global anomaly detection model to each NE of the set of NEs.

In a further implementation form of the fourth aspect, the method further comprises broadcasting to the set of NEs, at least one of:
the one or more configuration parameters derived from the updated global anomaly detection model;
one or more parameters of the global anomaly detection model;
one or more parameters of the updated global anomaly detection model.

The method of the fourth aspect achieves the advantages and effects described for the management entity of the first aspect.

A fifth aspect of the disclosure provides a method for a NE for supporting anomaly detection for a communication network, the method comprising determining, based on a local anomaly detection model, at least one point to be an anomalous point in KPI time-series data associated with the communication network, providing the at least one anomalous point to a management entity, receiving a label for each point of a set of points of the KPI time series data from the management entity, wherein the set of points includes the at least one anomalous point provided to the management entity, and updating the local anomaly detection model based on the received one or more labels.

In an implementation form of the fifth aspect, the method further comprises obtaining one or more updated parameters of the local anomaly detection model when updating the local anomaly detection model, and providing the one or more updated parameter to the management entity.

In a further implementation form of the fifth aspect, the method further comprises receiving one or more configuration parameters from the management entity, and updating the local anomaly detection model based on the one or more configuration parameters.

In a further implementation form of the fifth aspect, each respective label received from the management entity for a respective point of the set of points comprises one of:
an FP indicating that the NE wrongly determined the respective point to be an anomalous point,
an FN indicating that the NE wrongly determined the respective point to not be an anomalous point,
a TP indicating that the NE correctly determined the respective point to be an anomalous point,
a TN indicating that the NE correctly determined the respective point to not be an anomalous point.

In a further implementation form of the fifth aspect, the method further comprises generating, based on the received labels for the points of the set of points, a synthetically labelled training sample set, and updating the local anomaly detection model by training it with the synthetic labelled training sample set.

In a further implementation form of the fifth aspect, the method further comprises determining the at least one anomalous point by determining a prediction error for each potentially anomalous point detected in the KPI time series data by using the local anomaly detection module, determining a threshold error based on a distribution of prediction errors that already occurred in the NE, and determining a respective potentially anomalous point to be an anomalous point, when the prediction error for the respective potentially anomalous point is larger than the threshold error.

In a further implementation form of the fifth aspect, the method further comprises classifying each determined anomalous point.

The method of the fifth aspect achieves the advantages and effects described for the NE of the second aspect.

A sixth aspect of the present disclosure provides a computer program comprising a program code for performing the method according to the fourth aspect or the fifth aspect or any of their implementation forms.

A seventh aspect of the present disclosure provides a non-transitory storage medium storing executable program code which, when executed by a processor, causes the method according to the fourth aspect or the fifth aspect or any of their implementation forms to be performed.

It has to be noted that the devices, elements, units and means described in the present application could be implemented in software or hardware elements or any kind of combination thereof. The steps which are performed by the various entities described in the present application, as well as the functionalities described to be performed by the various entities, are intended to mean that the respective entity is adapted to or configured to perform the respective steps and functionalities. Even if, in the following description of exemplary embodiments, an exemplary functionality or step to be performed by external entities is not reflected in the description of a detailed element of that entity which performs that step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of exemplary embodiments in relation to the enclosed drawings, in which

FIG. 6 shows an example of extracted features by a local unsupervised detector of the NE;

DETAILED DESCRIPTION

Figure 1:
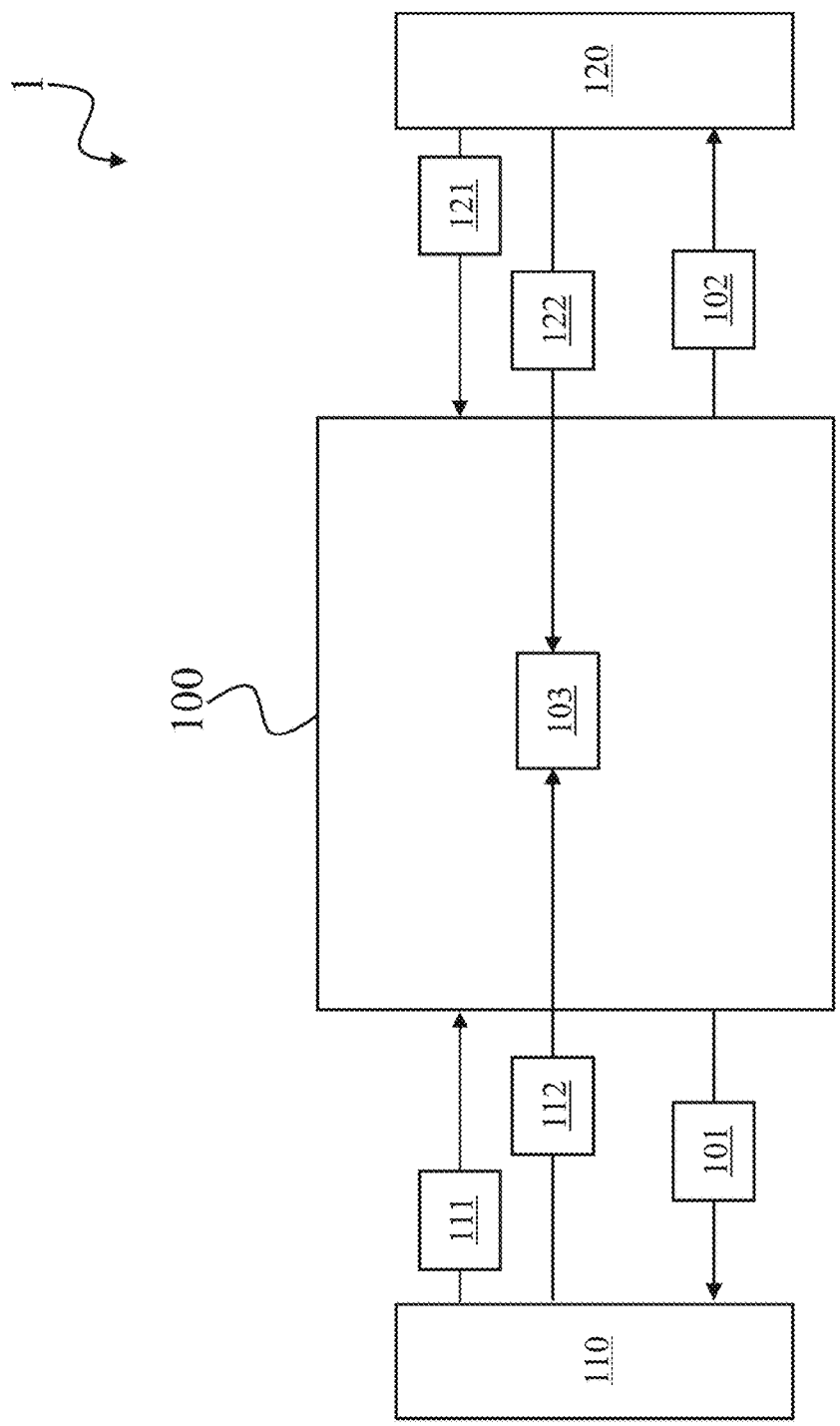
FIG. 1 depicts a management entity for supporting anomaly detection in a communication network, according to an exemplary embodiment of the disclosure.

FIG. 1 shows a management entity 100 for supporting anomaly detection in a communication network 1, according to an exemplary embodiment of the present disclosure.

The management entity 100 may be an electronic device such as a computer device for managing operations in the communication network 1.

The management entity 100 is configured to receive, from each of one or more NEs 110, 120 of a set of NEs 110, 120, at least one point 111, 121, wherein each point 111, 121 is determined to be an anomalous point. The one or more received points 111, 121 belong to KPI time-series data associated with the communication network 1. The points 111 and 121 may belong to the same or different KPI time-series data.

The NE 110 and the NE 120 may be based on the same network elements i.e., the NE 110 and the NE 120 may be identical network elements. Further, the NE 110 and the NE 120 may be based on similar network elements, for example, the NE 110 and the NE 120 may be configured to perform similar functionalities and/or are of the same type of NE.

The management entity 100 is further configured to provide, to each of the one or more NEs 110, 120, a label 101, 102 for each point of the one or more received points 111, 121.

The management entity 100 is further configured to receive, from each of the one or more NEs 110, 120, at least one parameter 112, 122 of an updated local anomaly detection model of that NE 110, 120.

The management entity 100 is further configured to update a global anomaly detection model 103 based on the one or more received parameters 112, 122.

The management entity 100 may comprise a processing circuitry (not shown in FIG. 1) configured to perform, conduct or initiate the various operations of the management entity 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the management entity 100 to perform, conduct or initiate the operations or methods described herein.

Figure 2:
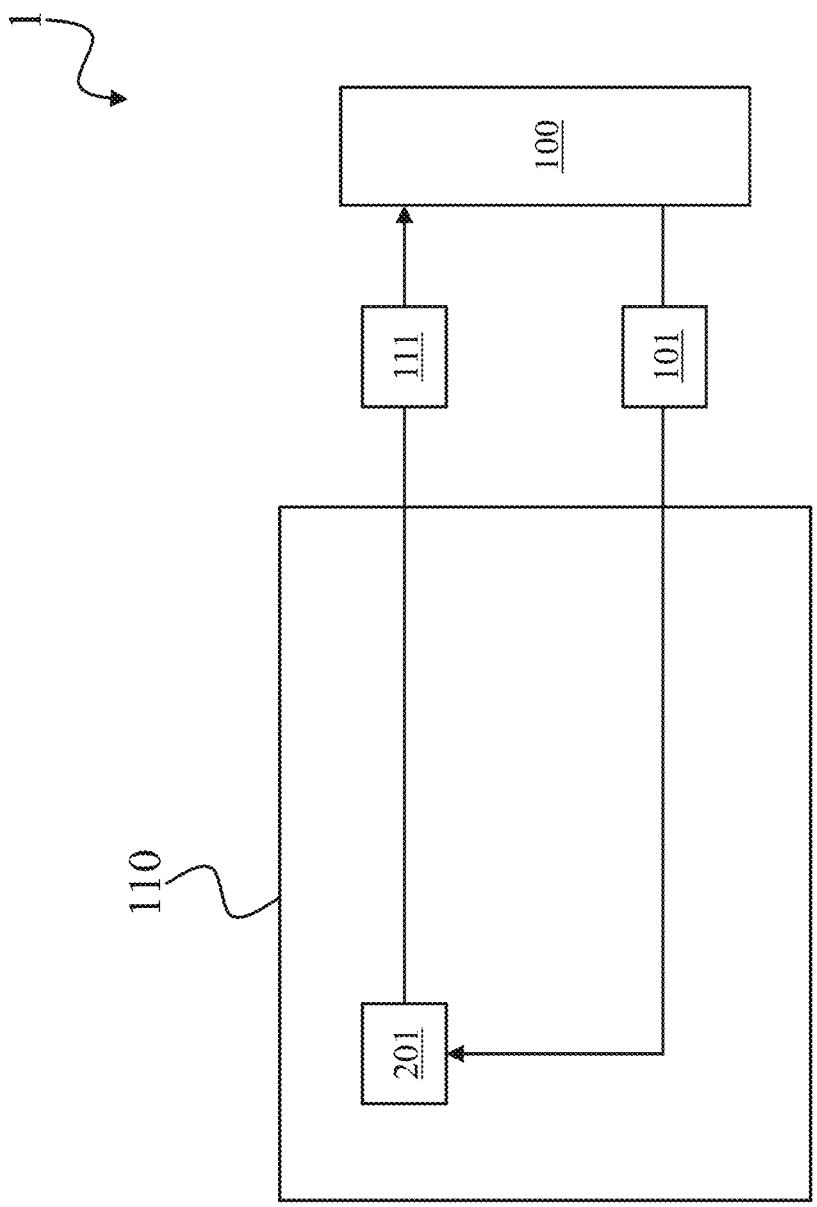
FIG. 2 depicts a NE for supporting anomaly detection for a communication network, according to an exemplary embodiment of the disclosure.

FIG. 2 depicts a schematic view of an NE 110 for supporting anomaly detection for a communication network 1, according to an exemplary embodiment of the disclosure.

The NE 110 is configured to determine, based on a local anomaly detection model 201, at least one point 111 to be an anomalous point in KPI time-series data associated with the communication network 1.

The NE 110 is further configured to provide the at least one anomalous point 111 to a management entity 100.

The NE 110 is further configured to receive a label 101 for each point 111 of a set of points of the KPI time series data from the management entity 100, wherein the set of points 111 includes the at least one anomalous point 111 provided to the management entity 100.

The NE 110 is further configured to update the local anomaly detection model 201 based on the received one or more labels 101.

The NE 110 may comprise a processing circuitry (not shown in FIG. 2) configured to perform, conduct or initiate the various operations of the NE 110 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the NE 110 to perform, conduct or initiate the operations or methods described herein.

Figure 3:
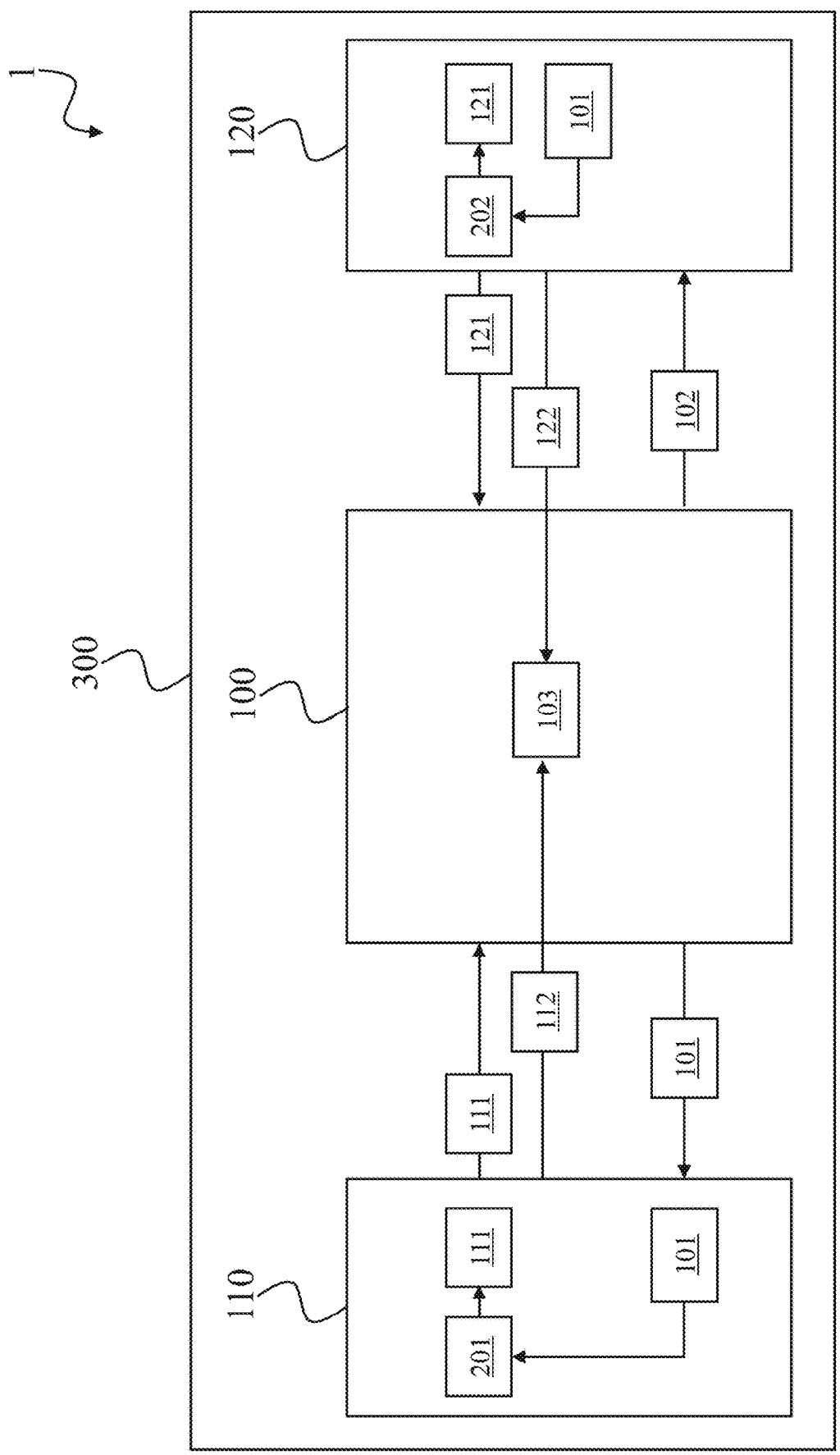
FIG. 3 depicts a system for supporting anomaly detection for a communication network, according to an exemplary embodiment of the disclosure.

FIG. 3 depicts a schematic view of a system 300 for supporting anomaly detection for a communication network, according to an exemplary embodiment of the disclosure.

The system 300 comprises a set of NEs 110, 120. For example, the NE 110 and the NE 120 may be identical NEs, without limiting the present disclosure to a specific type of NEs.

Each NE 110, 120 from the set of the NEs 110, 120 may be configured according to the NE 110 described with respect to FIG. 2. For example, each NE 110, 120 from the set of the NEs 110, 120 may be configured to determine, based on a local anomaly detection model 201, 202 at least one point 111, 112 to be an anomalous point in KPI time-series data associated with the communication network 1, provide the at least one anomalous point 111, 112 to a management entity 100, receive a label 101, 102 for each point 111, 112 of a set of points of the KPI time series data from the management entity 100, wherein the set of points 111, 112 includes the at least one anomalous point 111, 112 provided to the management entity 100, and update the local anomaly detection model 201, 202 based on the received one or more labels 101, 102.

The system 300 further comprises a management entity 100. The management entity 100 may be configured according to the management entity 100 which is described with respect to FIG. 1. For example, the management entity 100 may be configured to receive, from each of one or more NEs 110, 120 of a set of NEs 110, 120, at least one point 111, 121 determined to be an anomalous point, wherein the one or more received points 111, 121 belong to KPI time-series data associated with the communication network 1, provide, to each of the one or more NEs 110, 120, a label 101, 102 for each point of the one or more received points 111, 121, receive, from each of the one or more NEs 110, 120, at least one parameter 112, 122 of an updated local anomaly detection model of that NE 110, 120, and update a global anomaly detection model 103 based on the one or more received parameters 112, 122.

Figure 4:
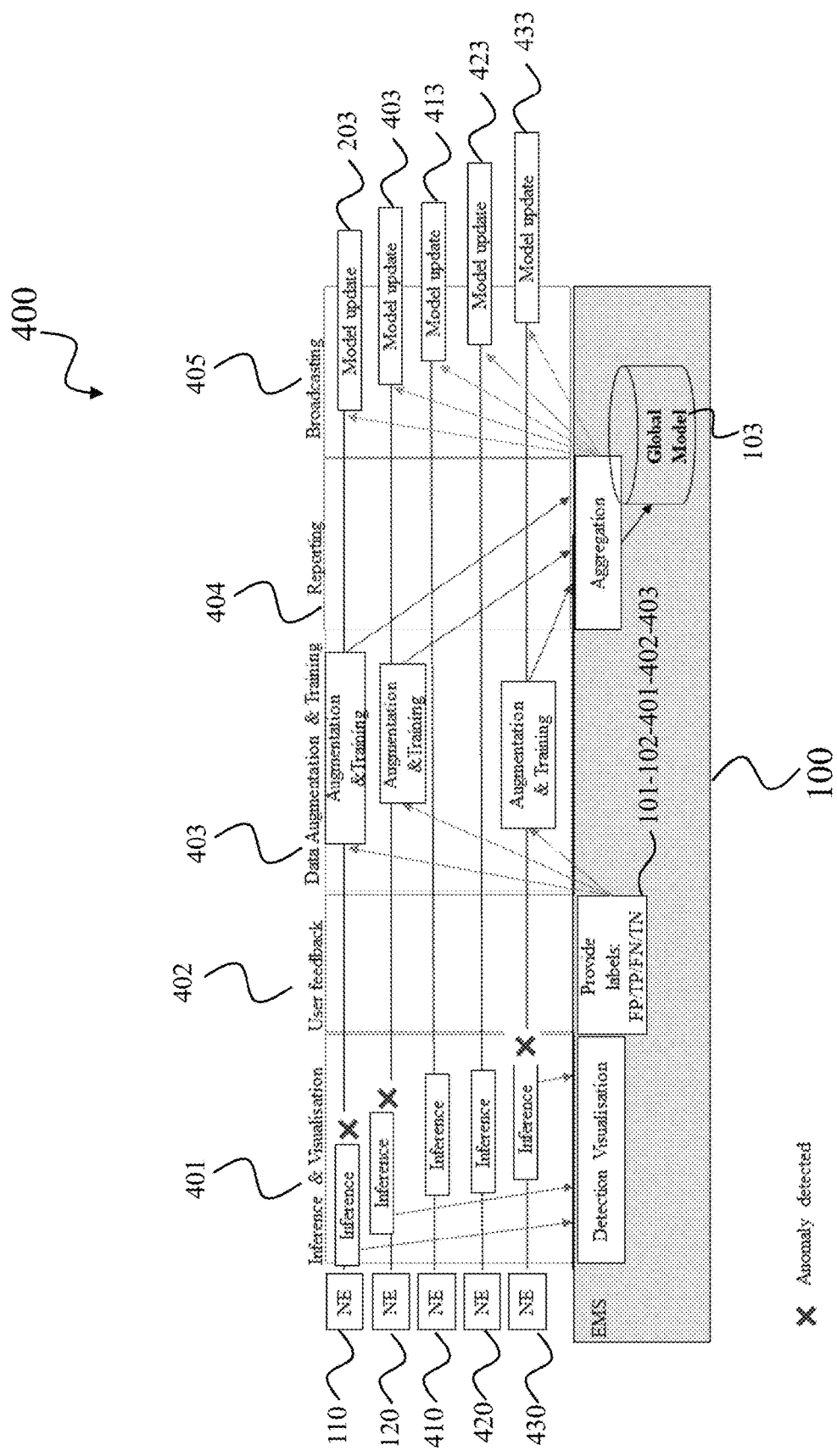
FIG. 4 shows a procedure for updating local anomaly detection models and global anomaly detection models.

FIG. 4 shows a method for updating the local anomaly detection models and the global anomaly detection models.

The method 400 may be carried out by the management entity 100 and/or the NE 110 and/or the system 300. The system 300 of FIG. 3 exemplarily comprises the management entity 100 and five NEs, including the NE 110, the NE 120, the NE 410, the NE 420, the NE 430, and the NE 440. The NE 120, the NE 410, the NE 420, the NE 430, and the NE 440 may be identical to the NE 110.

The method 400 comprises a step 401 of inference and visualizing. For example, the NEs 110, 120, 410, 420, 430 may perform inference that may comprise determining anomalous points in the KPI time-series data, in particular, determining the at least one point 111, 121 as anomalous point(s). The NEs 110, 120 may detect the at least one point 111, 112 using their local anomaly detection models. The at least one point 111, 112 may be determined to be an anomalous point, and may further be provided to the management entity 100. Further, the management entity 100 may visualize the set of the anomalous points, including the at least one anomalous point 111, 112, to a user or a supervisor or an operator of the system (or of the communication network).

The method 400 further comprises a step 402 of obtaining a feedback. For example, the management entity 100 may comprise a user interface that may allow a user to provide a feedback on visualized anomalies. The anomalies may be FP, FN, TP, or TN. The anomalies may also be generated and fed back automatically, for instance, by an agent or an artificial intelligence (AI) device.

The method 400 further comprises a step 403 of data augmentation and training. For example, the NEs 110, 120, 410, 420, 430 may send the labels 101, 102, 401, 402, 403, e.g., FP, FN, TP, or TN, to the respective NEs 110, 120, 410, 420, 430. The NEs 110, 120, 410, 420, 430 may locally perform a synthetic data augmentation based on the labels, e.g., the labels 101, 102, 401, 402, 403 that are provided by the user. Further, the NEs may train the local anomaly detection models.

The method 400 further comprises a step 404 of providing one or more parameters. For example, the NEs 110, 120, 410, 420, 430 may send the one or more parameters 112, 122 of the updated local anomaly detection models 203, 403, 413, 423, 433 to the management entity 100. The management entity 100 may receive the one or more parameters 112, 122, and may aggregate the one or more parameters of into the global anomaly detection model 103 which may be a classifier. Further, the management entity 100 obtain global anomaly detection model checkpoints and may further store the global anomaly detection model checkpoints in a storage.

The method 400 further comprises a step 405 of broadcasting. For example, the broadcasting 405 may comprise broadcasting the global anomaly detection model parameters and/or the updated global anomaly detection model parameters to the NEs 110, 120, 410, 420, 430 that are managed by the management entity 100. The management entity 100 may provide one or more configuration parameters derived from the updated global anomaly detection model 103 to each NE 110, 120, 410, 420, 430.

Figure 5:
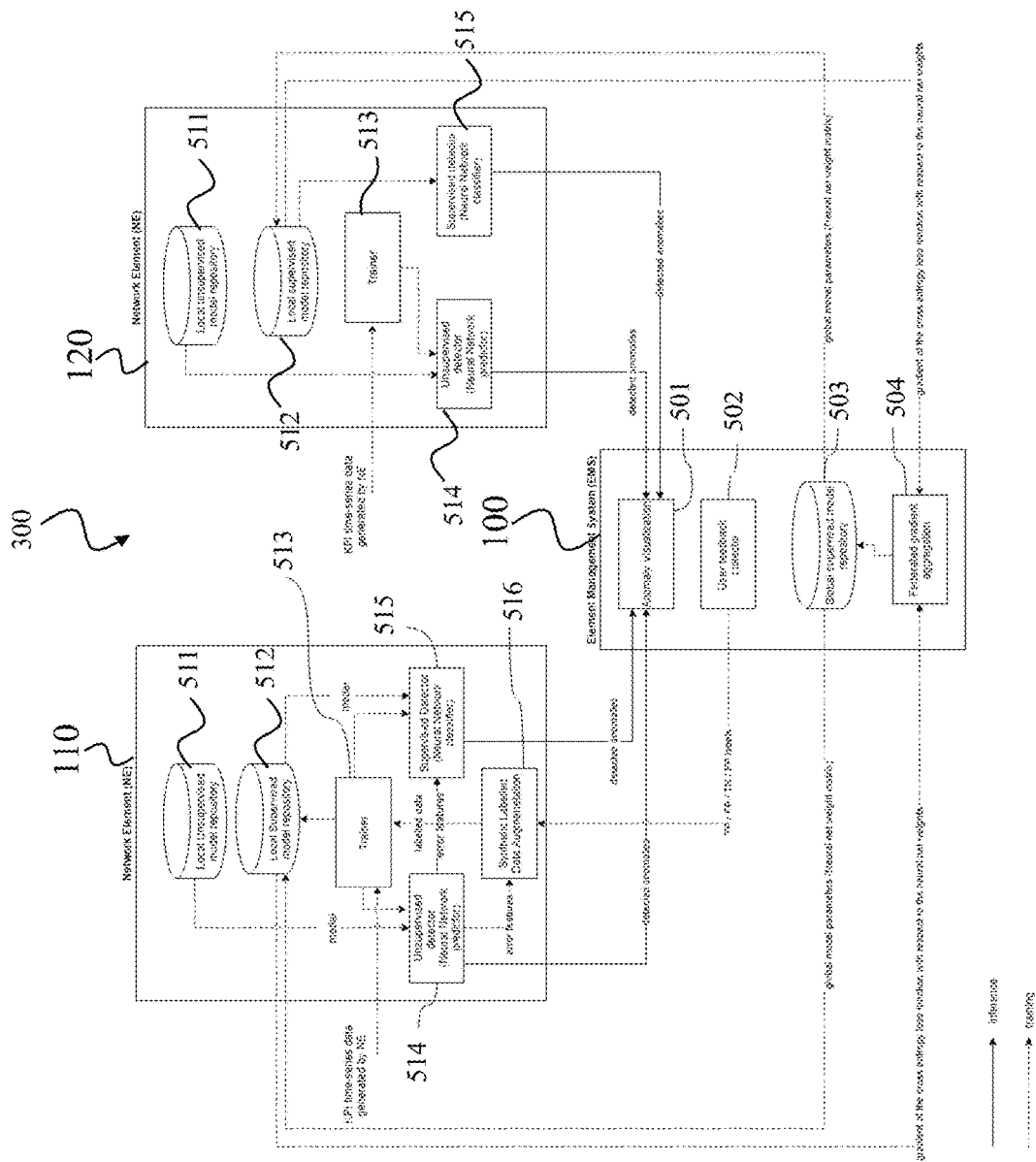
FIG. 5 shows a system for supporting anomaly detection in a communication network, according to an exemplary embodiment of the disclosure.

FIG. 5 shows a system 300 for supporting anomaly detection in a communication network, according to an exemplary embodiment of the disclosure. The system 300 of FIG. 5 builds on the system 300 shown in FIG. 3.

The system 300 comprises the management system 100, the NE 110 and the NE 120. The NE 110 and the NE 120 are based on similar elements. The NE 110 comprises a local unsupervised repository 511, a local supervised model repository 512, a trainer 513, an unsupervised detector 513 which is based on a neural network predictor, a supervised detector 514 which is based on a classifier and a synthetic labelled data augmentation 515. The NE 120 comprises the local unsupervised repository 511, the local supervised model repository 512, the trainer 513, the unsupervised detector 513 which is based on the neural network predictor and the supervised detector 514 which is based on the classifier.

The local unsupervised repository 511 and the local supervised model repository 512 are based on a Neural Networks that are trained using Stochastic Gradient Descent (SGD).

The trainer 513 may perform a training of the unsupervised 514 and supervised detectors 515. The unsupervised detector 514 may be trained online, for example, it may be continuously trained with KPI data generated at the NE 110, 120. The supervised detector 515 may be trained incrementally on demand, triggered by user-provided feedback.

The local unsupervised detector 514 may be based on a Neural Network that may take as input a past window of the KPI time-series up to time t and includes a single output that may predict the value of the time-series at time t+1.

The local unsupervised detector 515 may perform an anomaly detection inference and a feature extraction operation. The anomaly detection inference may be performed at each time-step by comparing the prediction error (residual)

against a threshold that may be based on percentile of the distribution of past prediction errors. Further, an anomaly may be reported, for example, when the prediction error exceeds the threshold.

The local unsupervised detector 514 may perform the feature extraction operation for use as input to the supervised detector 515.

Figure 6:
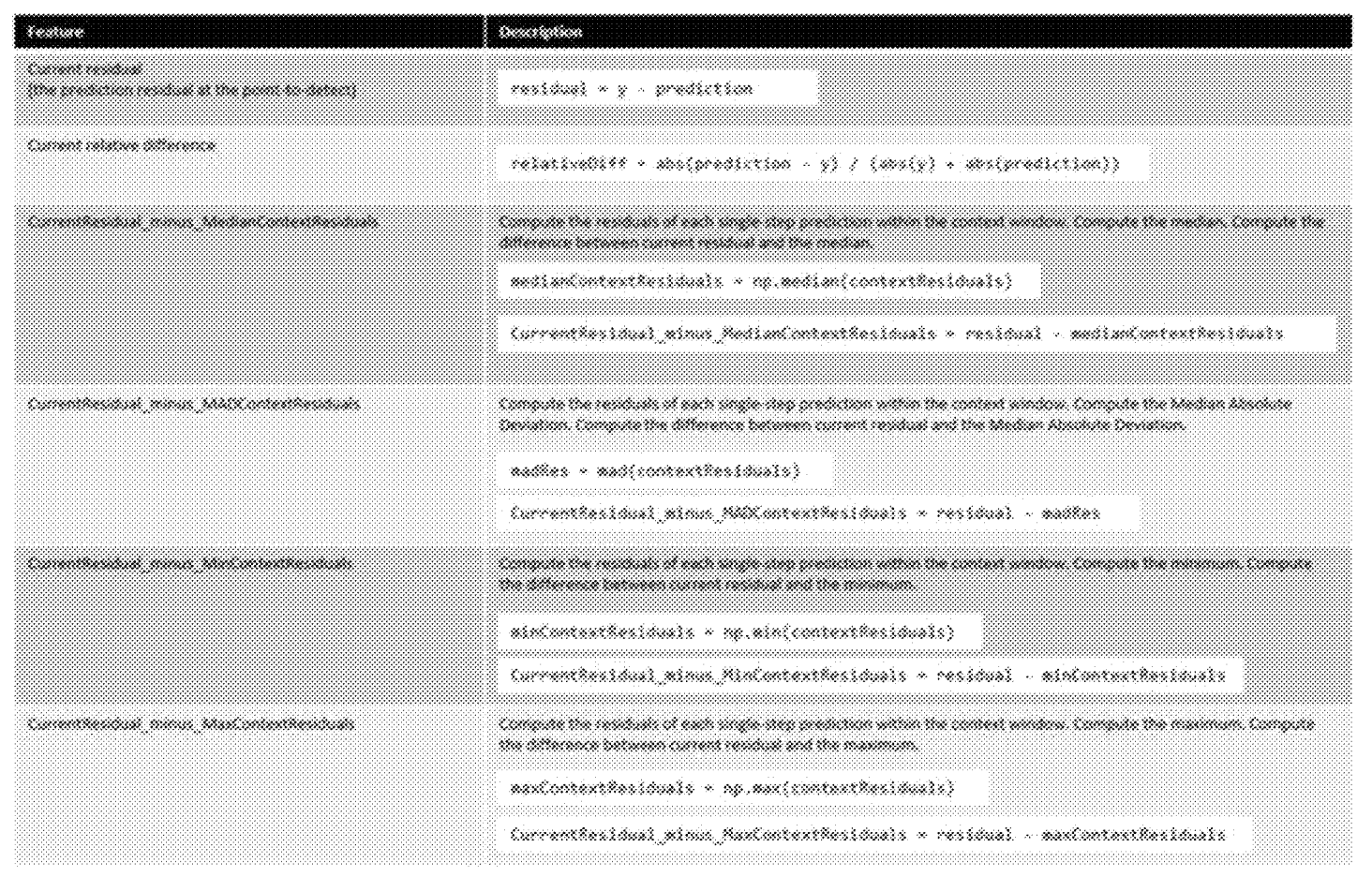

FIG. 6 shows an example of an extracted error feature by the local unsupervised detector 514 of the NE 110. The extracted error feature may be used as input in the supervised detector 515.

The local supervised detector 515 may be based on Neural Network (NN) binary classification model. The local supervised detector 515 may take as input the error features extracted from the unsupervised detector and may maps it into a binary output representing normal or anomaly classification decisions. Furthermore, the anomaly detection inference may be performed based on comparing the classification probability output against a threshold probability that, for example, may be specified by a user, an operator, a supervisor, or the like.

For example, a prediction error may be determined for each potentially anomalous point. Further, a threshold error may be obtained based on a distribution of prediction errors that already occurred in the NE 110. When the prediction error for the respective potentially anomalous point is larger than the threshold error, a potentially anomalous point may be determined to be an anomalous point.

The management system 100 may be based on an element management system (EMS). The management system 100 may comprise anomaly visualization unit 501, user feedback collector 502, global supervised model repository 503, and federated gradient aggregation 504.

The anomaly visualization unit 501 may include a Graphical User Interface (GUI) which may be configured to visualize the anomalies detected by the NE 110, 120.

Figure 7A:
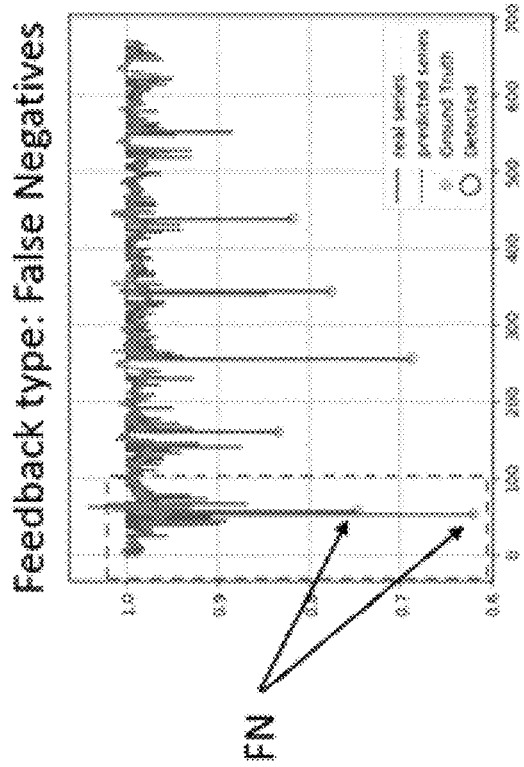
FIG. 7A-7B show examples of user feedback for a FP label and a FN label, respectively.
Figure 7B:
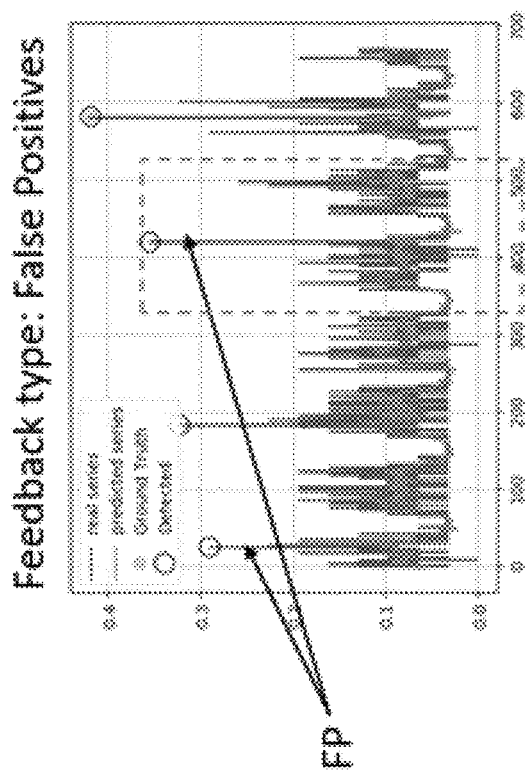

The user feedback collector 502 may collect the obtained feedbacks. An example of a feedback collector 502 is shown in FIG. 7A and FIG. 7B. For example, a user may provide feedback on the output of the anomaly visualization 501. The feedback may be, for example, labels such as FP, FN, TP, and TN. The management system 100 may provide the labels to the NE 110, 120.

FIG. 7A shows an example of a user feedback collector GUI of the anomaly visualization unit 501 of the NE 110, 120 that is an FP label. In FIG. 7A, the start timestamp of false positive window is 300 and the end timestamp of false window is 500.

FIG. 7B shows an example of a user feedback collector GUI of the anomaly visualization unit 501 of the NE 110, 120 that is an FN label. In FIG. 7B, the start timestamp of false negative window is 0 and the end timestamp of false window is 100.

The synthetic labelled data augmentation 516 of the NE 110, 120 may update the local supervised detector based on the few labelled examples provided by the user (FP/FN/TP/TN).

For example, the synthetic data augmentation may generate a large sample of training examples to train the supervised anomaly classifier model.

The global supervised detector 503 may be based on a global neural network anomaly classification model that may be trained using federated training. The parameters of the global neural network anomaly classification model may be in a form of a weight matrix that may be broadcasted to NEs 110, 120, periodically.

The federated gradient aggregation 504 may perform, e.g., a federated parameter aggregation for the global model, broadcast the parameters, or the like.

For example, the NE may update the global anomaly detection model 103 by integrating the federated aggregation of the one or more received parameters 112, 122 into the weight matrix of the neural network of the global anomaly detection model.

In the case of the local anomaly detection model gradients, the cross entropy error function with respect to the neural network weights may be computed on the most recently generated labelled data sample, and may be sent, subsequently, to the management system 100. For example, an asynchronous gradient transmission may be triggered, when a user provides a feedback.

The global anomaly detection model parameters may be updated with federated aggregation, which may be based on averaging all gradients that are sent from all the local anomaly detection models. Further, the global neural network model may be updated via a standard gradient descent.

Moreover, the parameters of the global anomaly detection model, for example, the neural net weight matrix may be periodically broadcasted to the NEs 110, 120 in order to update the local anomaly detection model, e.g., the local supervised detection models.

Figure 8:
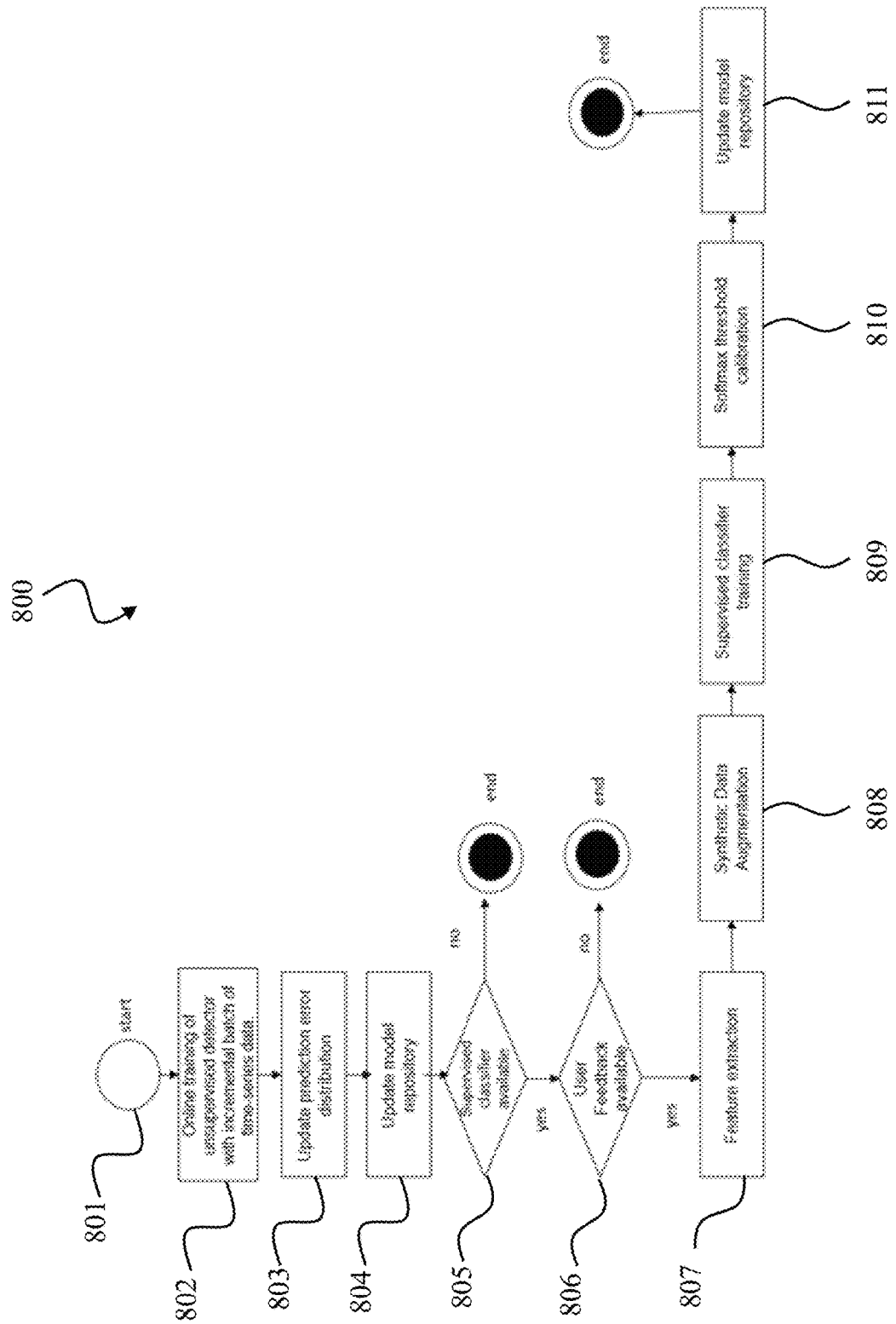
FIG. 8 shows a flowchart of a method for training supervised and unsupervised detectors of the NE.

FIG. 8 shows a flowchart of a method 800 for training supervised and unsupervised detectors of the NE 110. The method 800 may be performed by the NE 110.

At 801, the NE 110 may start the method 800.

At 802, the NE 110 may begin an online training of the unsupervised detector with an incremental batch of KPI time-series data.

At 803, the NE 110 may update the prediction error distribution of the NE 110.

At 804, the NE 110 may update model repository.

At 805, the NE 110 may determine whether a supervised classifier available or not. When it is determined "Yes", the NE 110 goes to step 806. However, when it is determined "No", the NE 110 ends the method 800.

At 806, the NE 110 may perform a feature extraction operation and obtain a feature.

At 807, the NE 110 may perform a synthetic data augmentation, as described above.

At 808, the NE 110 may train the supervised classifier.

At 809, the NE 110 may perform a softmax threshold calibration operation.

At 810, the NE 110 may update the model repository, and may further end the method 800.

Figure 9:
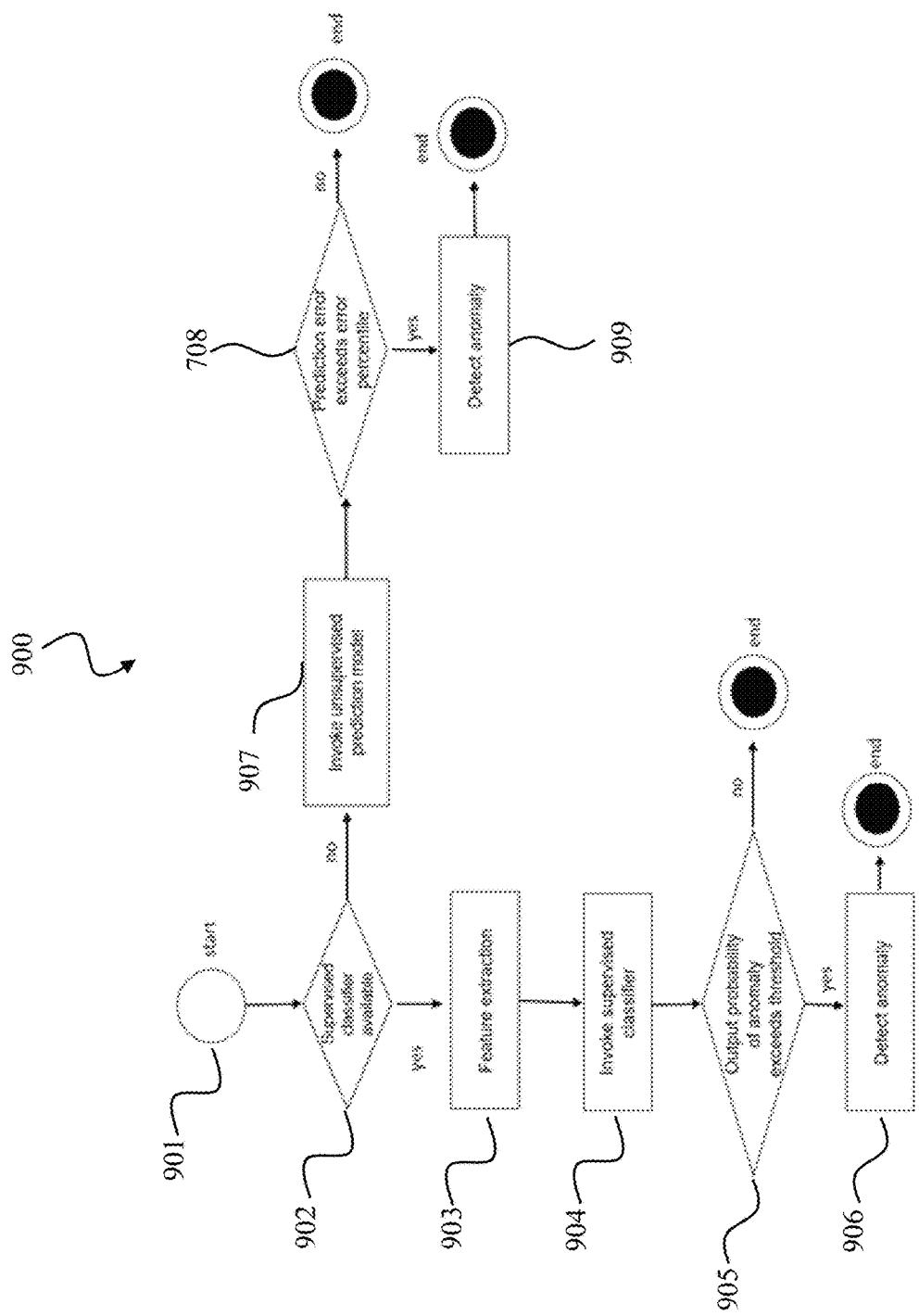
FIG. 9 shows a flowchart of a method for inference including real-time anomaly detection, based on supervised and unsupervised detectors of the NE.

FIG. 9 shows a flowchart of a method 900 for inference and real-time anomaly detection based on the supervised and unsupervised detectors of the NE 110. The method 900 may be performed by the NE 110.

At 901, the NE 110 may start the method 900.

At 902, the NE 110 may determine whether a supervised classifier is available or not. When it is determined "Yes", the NE 110 goes to step 903. However, when it is determined "No", the NE 110 ends the method 907.

At 903, the NE 110 may perform a feature extraction operation and obtain a feature.

At 904, the NE 110 may invoke a supervised classifier.

At 905, the NE 110 may determine whether an output probability of anomaly exceeds the threshold value or not. When it is determined "Yes", the NE 110 goes to step 906. However, when it is determined "No", the NE 110 ends the method 900.

At 907, the NE 110 may invoke the unsupervised prediction model.

At 908, the NE 110 may determine whether a prediction error exceeds an error percentile. When it is determined "Yes", the NE 110 goes to step 909. However, when it is determined "No", the NE 110 ends the method 800.

At 909, the NE 110 may detect the anomaly and may further end the method 900.

Figure 10:
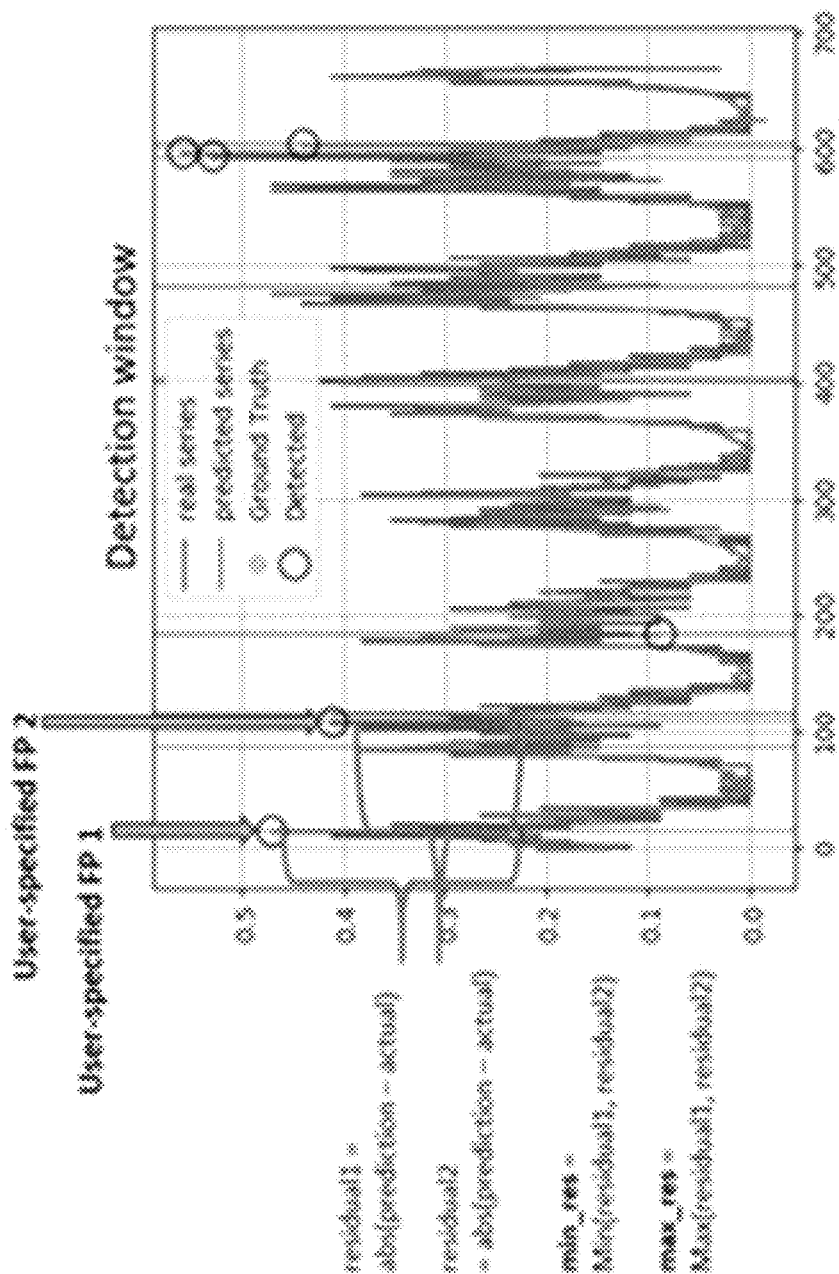
FIG. 10 shows an example of synthetic data augmentation based on a FP label.

FIG. 10 shows an example of a synthetic data augmentation based on a false positive label. The synthetic data augmentation may be obtained the NE 110, and the supervised model may be updated by means of SGD via the trainer module.

For example, the NE 110 may initially obtain FP labels from user on specific time-series points and may further invoke the unsupervised model to compute prediction residuals. The prediction residual may be defined as the absolute value of the difference between an actual value of the time-series point and a predicted value of the time-series point. The predicted values may be produced by the unsupervised model that may receive as input vector a window of size w $[s_{t\_w}, s_{t\_w+1}, \ldots s_t]$ of time-series values up to time t and predicts the time-series value at time t+1. 2.

The NE 110 may obtain a minimum prediction residual min res among and a maximum prediction residual max res among all False Positive points provided by user. 3. The NE 110 may obtain all input vectors with prediction residual res<min res. Then, the NE 110 may sort the list of input vectors in ascending order of prediction residual magnitude.

Next, the NE 110 may select K input vectors from the end of the list. These may be the true negative examples. For all consecutive input vectors of size w $[s_{t-w}, s_{t-w+1}, \ldots s_t]$ in current detection window, the NE 110 may generate the synthetic vector by sampling in N times, in order to add a Gaussian noise with certain mean and a certain standard deviation at the most recent element of the input vector.

The NE 110 may further select M of those synthetic vectors with prediction residual res>max res.

The NE 110 may further sort the M synthetic vectors in ascending order of prediction residual magnitude and may further select first L<<M synthetic vectors. The training set may include K true negative examples and L synthetic positive examples.

Figure 11:
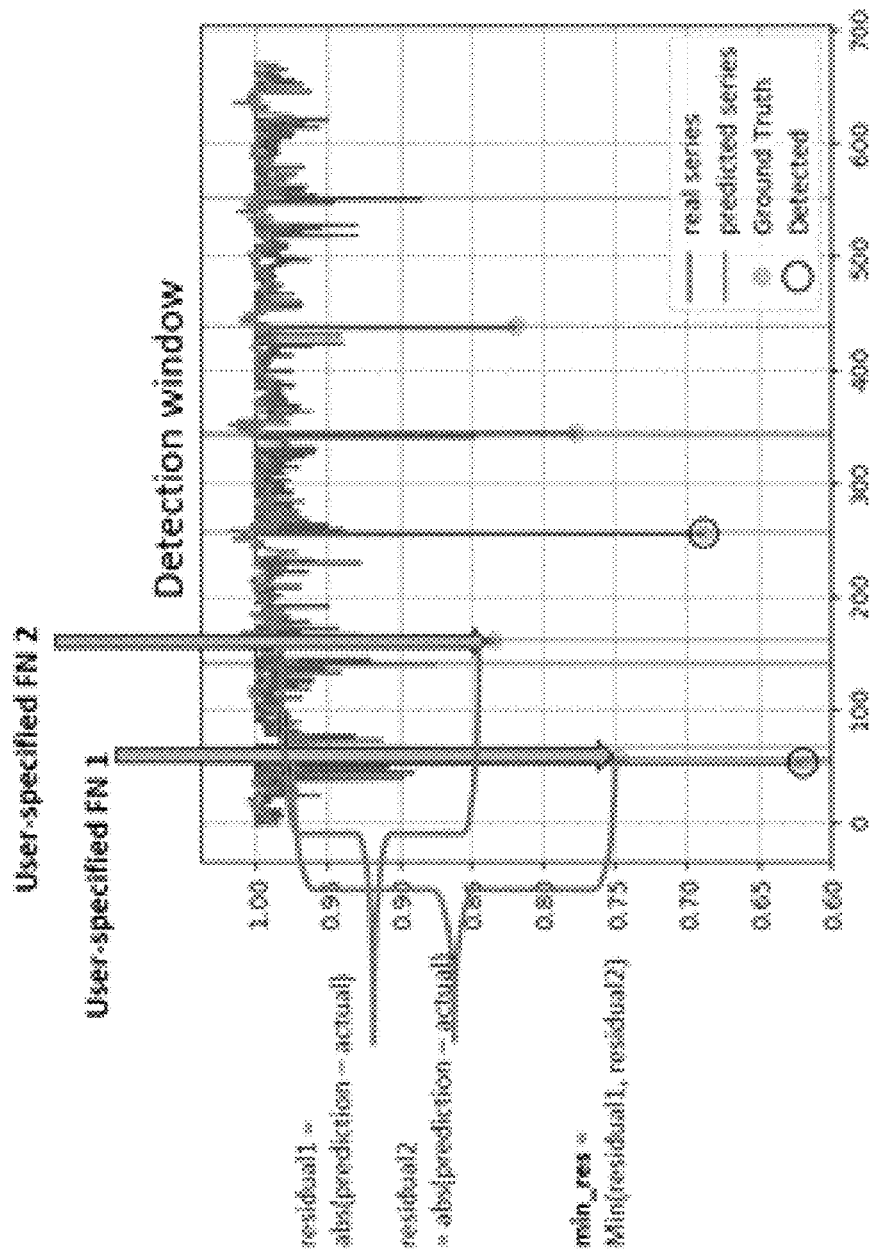
FIG. 11 shows an example of synthetic data augmentation based on a FN label.

FIG. 11 shows an example of a synthetic data augmentation based on a false negative label. The synthetic data augmentation may be obtained the NE 110, and the supervised model may be updated by means of SGD via the Trainer module.

For example, the NE 110 may initially obtain FN labels from user on specific time-series points and may invoke the unsupervised model to compute prediction residuals. The prediction residual may be defined as the absolute value of the difference between an actual value of the time-series point and a predicted value of the time-series point. The predicted values may be produced by the unsupervised model that may receive as input vector a window of size w $[s_{t-w}, s_{t-w+1}, \ldots s_t]$ of time-series KPI values up to time t and may predict the time-series value at time t+1.

The NE 110 may obtain a minimum prediction residual min res among all of the False Negative points provided by user.

Next, the NE 110 may obtain all input vectors with prediction residual res<min res. Afterwards, the NE 110 may sort the list of input vectors in ascending order of prediction residual magnitude.

The NE 110 may select K input vectors from the end of the list. The selected K input vectors may be the true negative examples. Moreover, the NE 110 may generate a synthetic vector, for all consecutive input vectors of size w $[s_{t-w}, s_{t-w+1}, \ldots s_t]$ in current detection window, for example, by sampling N times in order to add a Gaussian noise with certain mean and a certain standard deviation at the most recent element of the input vector.

The NE 110 may further select M of those synthetic vectors having prediction residual res>=min res. The NE 110 may sort the M synthetic vectors in ascending order of prediction residual magnitude. Afterwards, the NE 110 may select first 1_<<M synthetic vectors. The training set contains K true negative examples and L synthetic positive examples.

Figure 12:
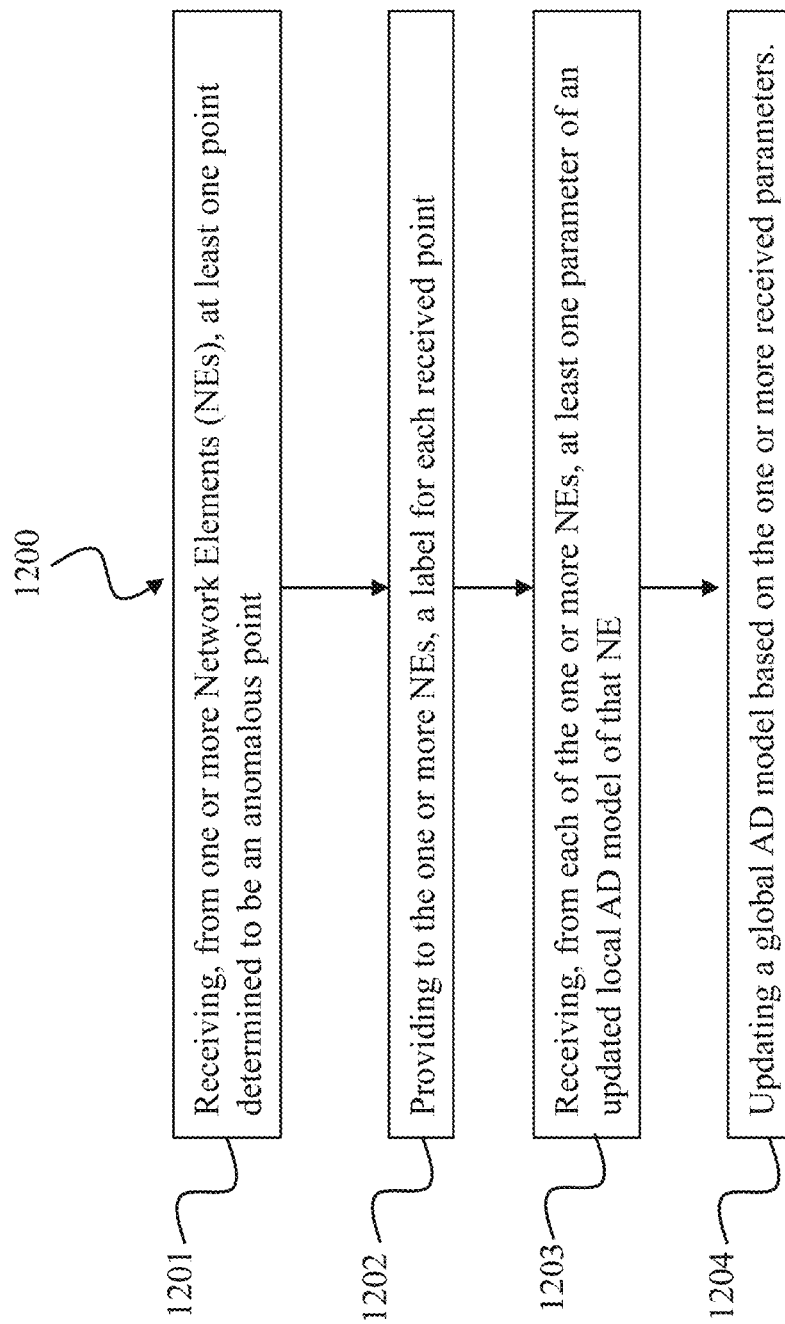
FIG. 12 depicts a flowchart of a method for a management entity for supporting anomaly detection in a communication network, according to an exemplary embodiment of the disclosure.

FIG. 12 shows a method 1200 according to an embodiment of the disclosure for a management entity 100 for supporting anomaly detection in a communication network 1. The method 1200 may be carried out by the management entity 100, as it described above.

The method 1200 comprises a step 1201 of receiving, from each of one or more NEs 110, 120 of a set of NEs 110, 120, at least one point 111, 121 determined to be an anomalous point, wherein the one or more received points 111, 121 belong to KPI time-series data associated with the communication network 1.

The method 1200 further comprises a step 1202 of providing, to each of the one or more NEs 110, 120, a label 101, 102 for each point of the one or more received points 111, 121.

The method 1200 further comprises a step 1203 of receiving, from each of the one or more NEs 110, 120, at least one parameter 112, 122 of an updated local anomaly detection model of that NE 110, 120.

The method 1200 further comprises a step 1204 of updating a global anomaly detection model 103 based on the one or more received parameters 112, 122.

In some implementation forms, the method 1200 may further comprise broadcasting the one or more parameters of the global anomaly detection model and/or the one or more parameters of the updated global anomaly detection model and/or the one or more configuration parameters derived from the updated global anomaly detection model to the set of the NEs 110, 120 that are managed by the management entity 100.

Figure 13:
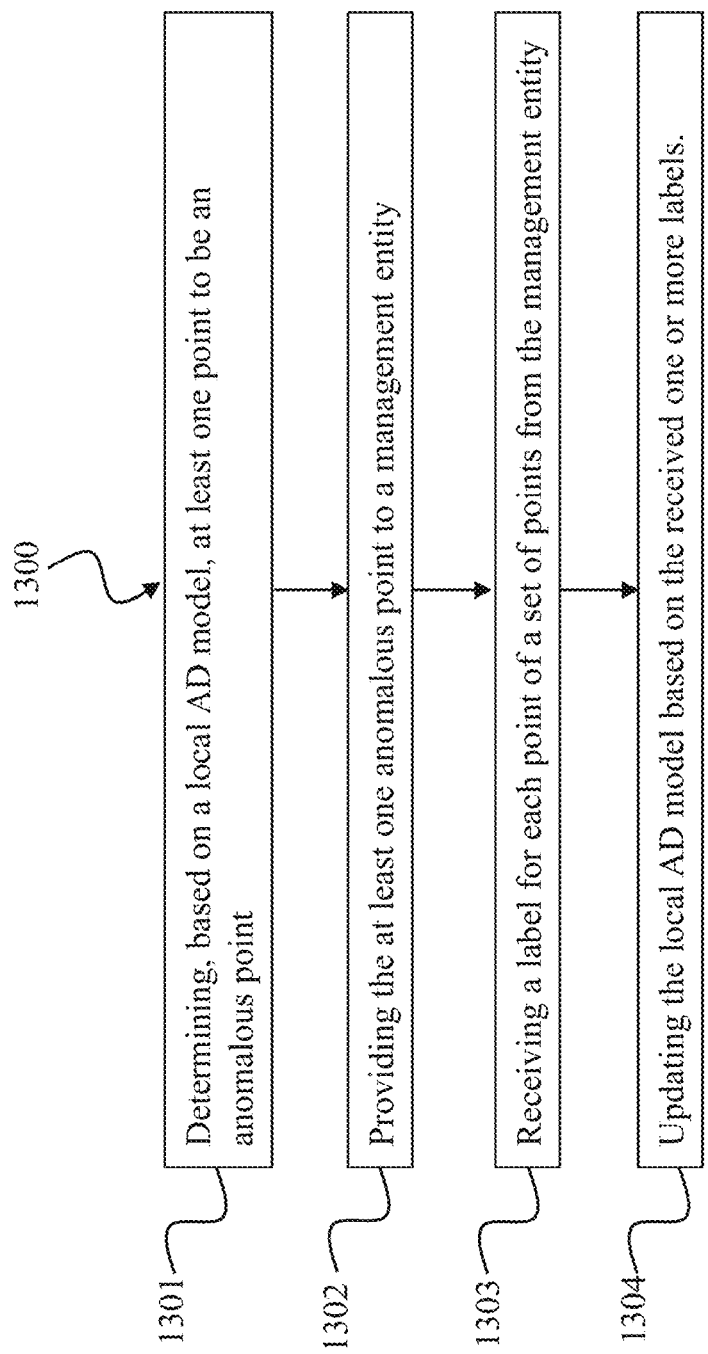
FIG. 13 depicts a flowchart of a method for an NE for supporting anomaly detection for a communication network, according to an exemplary embodiment of the disclosure.

FIG. 13 shows a method 1300 according to an embodiment of the disclosure for an NE 110 for supporting anomaly detection for a communication network 1. The method 1300 may be carried out by the NE 100, as it described above.

The method 1300 comprises a step 1301 of determining, based on a local anomaly detection model 201, at least one point 111 to be an anomalous point in KPI time-series data associated with the communication network 1.

The method 1300 comprises a step 1302 of providing the at least one anomalous point 111 to a management entity 100.

The method 1300 comprises a step 1303 of receiving a label 101 for each point 111 of a set of points of the KPI time series data from the management entity 100, wherein the set of points 111 includes the at least one anomalous point 111 provided to the management entity 100.

The method 1300 comprises a step 1304 of updating the local anomaly detection model 201 based on the received one or more labels 101.

Figure 14:
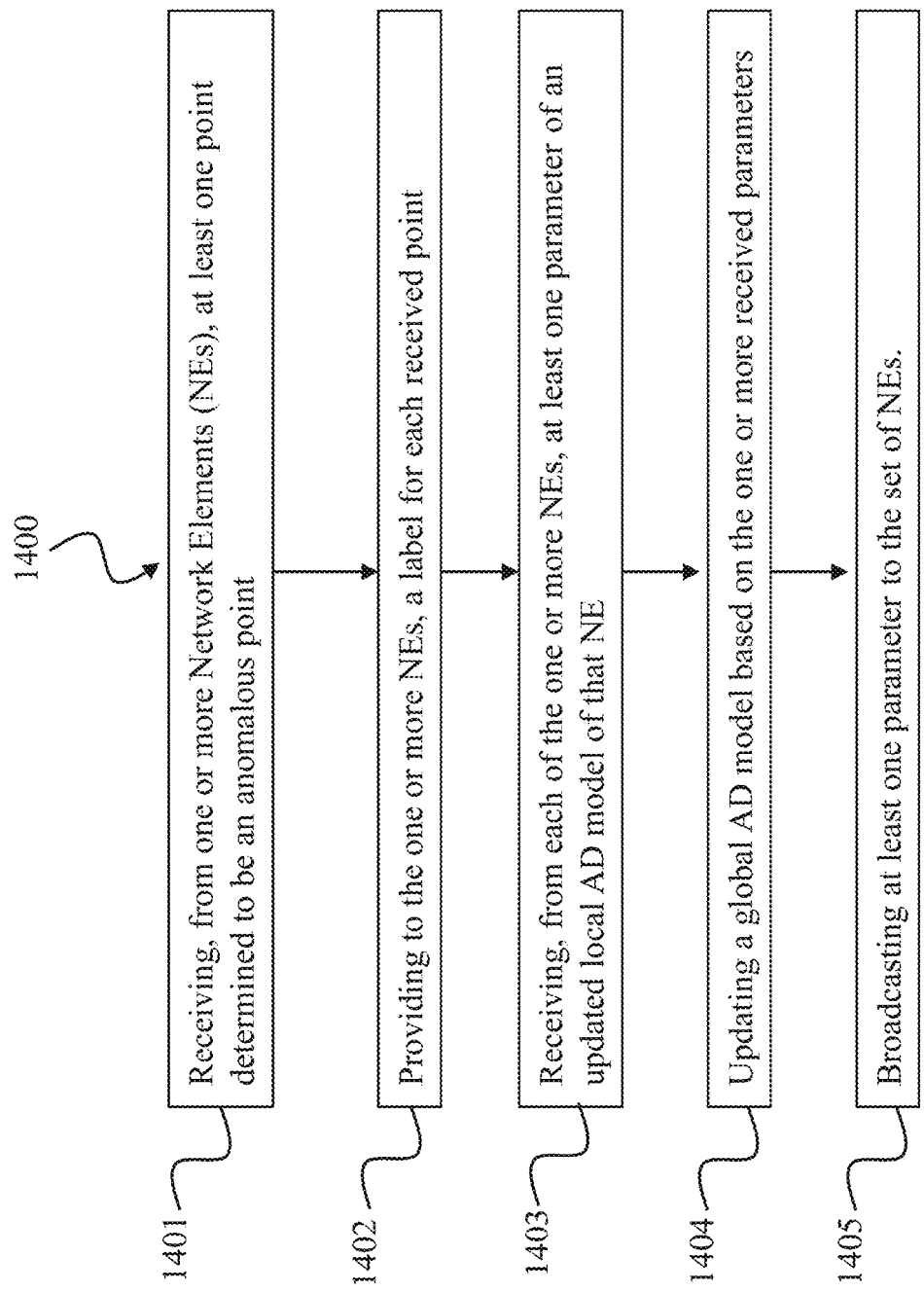
FIG. 14 depicts a flowchart of a method for a management entity for supporting anomaly detection in a communication network, according to an exemplary embodiment of the disclosure.

FIG. 14 shows a method 1400 according to an embodiment of the disclosure for a management entity 100 for supporting anomaly detection in a communication network 1. The method 1400 may be carried out by the management entity 100, as it described above.

The method 1400 comprises a step 1401 of receiving, from each of one or more NEs 110, 120 of a set of NEs 110, 120, at least one point 111, 121 determined to be an anomalous point, wherein the one or more received points 111, 121 belong to KPI time-series data associated with the communication network 1.

The method 1400 further comprises a step 1402 of providing, to each of the one or more NEs 110, 120, a label 101, 102 for each point of the one or more received points 111, 121.

The method 1400 further comprises a step 1403 of receiving, from each of the one or more NEs 110, 120, at least one parameter 112, 122 of an updated local anomaly detection model of that NE 110, 120.

The method 1400 further comprises a step 1404 of updating a global anomaly detection model 103 based on the one or more received parameters 112, 122.

The method 1400 further comprises a step 1405 of broadcasting at least one parameter to the set of NEs 110, 120. For example, the management entity 100 may broadcast, to the set of NEs 110, 120, at least one of:
one or more configuration parameters derived from the updated global anomaly detection model;
one or more parameters of the global anomaly detection model;
one or more parameters of the updated global anomaly detection model.

The present disclosure has been described in conjunction with various embodiments as examples as well as implementations. However, other variations can be understood and effected by those persons skilled in the art and practicing the claimed disclosure, from the studies of the drawings, this disclosure, and the independent claims. In the claims, as well as in the description, the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A management entity for supporting anomaly detection in a communication network, the management entity being configured to:
receive, from each of one or more network elements (NEs) of a set of NEs, at least one point determined to be an anomalous point, wherein the one or more points belong to key performance indicator (KPI) time-series data associated with the communication network;
provide, to each respective NE of the one or more NEs, a label for a respective point of the one or more points;
receive, from each respective NE of the one or more NEs, at least one parameter of an updated local anomaly detection model of the respective NE; and
update a global anomaly detection model based on the one or more parameters;
wherein updating the global anomaly detection model comprises integrating a federated aggregation of the one or more received parameters into a weight matrix of a neural network of the global anomaly detection model.

2. The management entity according to claim 1, wherein the label provided to the respective NE for the respective point comprises one of:
a false positive (FP), indicating that the respective NE incorrectly determined the respective point to be anomalous;
a false negative (FN), indicating that the respective NE incorrectly determined the respective point to be not anomalous;
a true positive (TP), indicating that the respective NE correctly determined the respective point to be anomalous; or
a true negative (TN), indicating that the respective NE correctly determined the respective point to be not anomalous.

3. The management entity according to claim 1, further configured to:
visualize each point of the one or more received points;
receive user feedback regarding each point; and
determine the label for each point based on the user feedback.

4. The management entity according to claim 1, further configured to:
provide one or more configuration parameters derived from the updated global anomaly detection model to each NE of the set of NEs.

5. The management entity according to claim 1, further configured to broadcast, to the set of NEs, at least one of:
one or more configuration parameters derived from the updated global anomaly detection model;
one or more parameters of the global anomaly detection model; or
one or more parameters of the updated global anomaly detection model.

6. A system for supporting anomaly detection for a communication network, the system comprising a management entity and a set of network elements (NEs),
wherein each NE of the set of NEs is configured to:
determine, based on a local anomaly detection model, at least one point to be an anomalous point in key performance indicator (KPI) time-series data associated with the communication network;
provide the anomalous point to the management entity;
receive, from the management entity, a respective label for each respective point of a set of points of the KPI time series data, wherein the set of points includes the anomalous point provided to the management entity; and
update the local anomaly detection model based on the labels for the set of points;
wherein the management entity is configured to:
receive, from each respective NE of the one or more NEs, one or more parameters of the updated local anomaly detection model of the respective NE; and
update a global anomaly detection model based on the one or more received parameters, wherein updating the global anomaly detection model comprises integrating a federated aggregation of the one or more received parameters into a weight matrix of a neural network of the global anomaly detection model.

7. The system according to claim 6, wherein each NE is further configured to:
obtain one or more updated parameters of the local anomaly detection model as the local anomaly detection model is being updated; and
provide the one or more updated parameters to the management entity.

8. The system according to claim 6, wherein each NE is further configured to:
receive one or more configuration parameters from the management entity; and
update the local anomaly detection model based on the one or more configuration parameters.

9. The system according to claim 6, wherein each respective label received from the management entity for the respective point of the set of points comprises one of:
- a false positive (FP), indicating that the NE incorrectly determined the respective point to be anomalous;
- a false negative (FN), indicating that the NE incorrectly determined the respective point to be not anomalous;
- a true positive (TP), indicating that the NE correctly determined the respective point to be anomalous; or
- a true negative (TN), indicating that the NE correctly determined the respective point to be not anomalous.

10. The system according to claim 6, wherein each NE is further configured to:
- generate, based on the labels for the set of points, a synthetically labelled training sample set; and
- update the local anomaly detection model by training the local anomaly detection model with the synthetic labelled training sample set.

11. The system according to claim 6, wherein determining the at least one point to be the anomalous point comprises:
- determining a prediction error for each potentially anomalous point detected in the KPI time series data by using the local anomaly detection module;
- determining a threshold error based on a distribution of prediction errors that already occurred in the NE; and
- determining a respective potentially anomalous point to be the anomalous point, upon determining that the prediction error for the respective potentially anomalous point is greater than the threshold error.

12. The system according to claim 6, wherein each NE is further configured to:
- classify each anomalous point.

13. A method for a management entity for supporting anomaly detection in a communication network, the method comprising:
- receiving, from each of one or more network elements (NEs)) of a set of NEs, at least one point determined to be an anomalous point, wherein the one or more points belong to key performance indicator (KPI) time-series data associated with the communication network;
- providing, to each of the one or more NEs, a label for each point of the one or more points;
- receiving, from each respective NE of the one or more NEs, at least one parameter of an updated local anomaly detection model of the respective NE; and
- updating a global anomaly detection model based on the one or more parameters;
- wherein updating the global anomaly detection model comprises integrating a federated aggregation of the one or more received parameters into a weight matrix of a neural network of the global anomaly detection model.

14. The method according to claim 13, wherein the label comprises one of:
- a false positive (FP), indicating that the respective NE incorrectly determined the respective point to be anomalous;
- a false negative (FN), indicating that the respective NE incorrectly determined the respective point to be not anomalous;
- a true positive (TP), indicating that the respective NE correctly determined the respective point to be anomalous; or
- a true negative (TN), indicating that the respective NE correctly determined the respective point to be not anomalous.

15. A method for a network element (NE) for supporting anomaly detection for a communication network, the method comprising:
- determining, based on a local anomaly detection model, at least one point to be an anomalous point in key performance indicator (KPI) time-series data associated with the communication network;
- providing the anomalous point to a management entity;
- receiving a label for each point of a set of points of the KPI time series data from the management entity, wherein the set of points includes the anomalous point provided to the management entity;
- updating the local anomaly detection model based on the one or more labels; and
- providing at least one parameter of the updated local anomaly detection model to the management entity, wherein the management entity is configured to update a global anomaly detection model by integrating a federated aggregation of one or more received parameters into a weight matrix of a neural network of the global anomaly detection model.

16. The method according to claim 15, wherein determining the at least one point to be the anomalous point comprises:
- determining a prediction error for each potentially anomalous point detected in the KPI time series data by using the local anomaly detection module;
- determining a threshold error based on a distribution of prediction errors that already occurred in the NE; and
- determining a respective potentially anomalous point to be the anomalous point, upon determining that the prediction error for the respective potentially anomalous point is greater than the threshold error.

* * * * *